US010346431B1

(12) United States Patent
Broda et al.

(10) Patent No.: US 10,346,431 B1
(45) Date of Patent: Jul. 9, 2019

(54) SYSTEM AND METHOD FOR AUTOMATED RUN-TME SCALING OF CLOUD-BASED DATA STORE

(71) Applicant: Akamai Technologies, Inc., Cambridge, MA (US)

(72) Inventors: Tal Broda, Sunnyvale, CA (US); Matthew Solnit, San Jose, CA (US); Albert Hong, Palo Alto, CA (US); Ben Wood, Mountain View, CA (US); Bobby Kritzer, San Jose, CA (US); Fei Xie, San Francisco, CA (US); Michael Hemmert, Scotts Valley, CA (US); Eric Ellis, San Bruno, CA (US); Shilpi Nayak, Sunnyvale, CA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 470 days.

(21) Appl. No.: 14/688,245

(22) Filed: Apr. 16, 2015

(51) Int. Cl.
*G06F 16/27* (2019.01)
*H04L 29/08* (2006.01)
*G06F 3/0484* (2013.01)

(52) U.S. Cl.
CPC ........ *G06F 16/278* (2019.01); *G06F 3/04847* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,414,809 | A | 5/1995 | Hogan et al. |
| 5,615,347 | A | 3/1997 | Davis et al. |
| 5,724,525 | A | 3/1998 | Beyers et al. |
| 5,945,986 | A | 8/1999 | Bargar et al. |
| 6,025,853 | A | 2/2000 | Baldwin |
| 6,092,043 | A | 7/2000 | Squires et al. |
| 6,134,582 | A | 10/2000 | Kennedy |
| 6,317,786 | B1 | 11/2001 | Yamane et al. |
| 6,434,513 | B1 | 8/2002 | Sherman et al. |

(Continued)

OTHER PUBLICATIONS

Dillenseger, "CLIF, a framework based on Fractal for flexible, distributed load testing" Nov. 18, 2008, Ann. Telecommun., 64:101-120.

(Continued)

*Primary Examiner* — Ashish Thomas
*Assistant Examiner* — Dustin D Eyers

(57) ABSTRACT

A computer-implemented method includes providing a user interface (UI) that allows a user to select an existing database having cloud storage volumes that contain historical data of one or more customers. A first command input on the UI replicates the existing database is to create one or more new databases. Each of the new databases has new cloud storage volumes created by taking a snapshot of a corresponding one of the volumes of the existing database. Each new database contains the historical data of the existing database such that a new set of databases results. A mapping algorithm is executed in a cloud-computing instance that maps the historical data of each of the one or more customers to produce a shard map. The mapping algorithm includes a round-robin partitioning of the historical data striped by date in a circular order across the new set of databases.

15 Claims, 9 Drawing Sheets

(56) References Cited

U.S. PATENT DOCUMENTS

| | | |
|---|---|---|
| 6,477,483 B1 | 11/2002 | Scarlat et al. |
| 6,542,163 B2 | 4/2003 | Gorbet et al. |
| 6,560,564 B2 | 5/2003 | Scarlat et al. |
| 6,563,523 B1 | 5/2003 | Suchocki et al. |
| 6,601,020 B1 | 7/2003 | Myers |
| 6,738,933 B2 | 5/2004 | Fraenkel et al. |
| 6,792,393 B1 | 9/2004 | Farel et al. |
| 6,817,010 B2 | 11/2004 | Aizenbud-Reshef et al. |
| 6,898,556 B2 | 5/2005 | Smocha et al. |
| 6,959,013 B1 | 10/2005 | Muller et al. |
| 6,975,963 B2 | 12/2005 | Hamilton et al. |
| 7,050,056 B2 | 5/2006 | Meyringer |
| 7,133,805 B1 | 11/2006 | Dankenbring et al. |
| 7,216,168 B2 | 5/2007 | Merriam |
| 7,334,162 B1 | 2/2008 | Vakrat et al. |
| 7,376,902 B2 | 5/2008 | Lueckhoff |
| 7,464,121 B2 | 12/2008 | Barcia et al. |
| 7,478,035 B1 | 1/2009 | Wrench et al. |
| 7,548,875 B2 | 6/2009 | Mikkelsen et al. |
| 7,587,638 B2 | 9/2009 | Shah et al. |
| 7,594,238 B2 | 9/2009 | Takahashi |
| 7,607,169 B1 | 10/2009 | Njemanze et al. |
| 7,617,201 B1 | 11/2009 | Bedell et al. |
| 7,630,862 B2 | 12/2009 | Glas et al. |
| 7,685,234 B2 | 3/2010 | Gottfried |
| 7,689,455 B2 | 3/2010 | Fligler et al. |
| 7,693,947 B2 | 4/2010 | Judge et al. |
| 7,725,812 B1 | 5/2010 | Balkus et al. |
| 7,743,128 B2 | 6/2010 | Mullarkey |
| 7,757,175 B2 | 7/2010 | Miller |
| 7,844,036 B2 | 11/2010 | Gardner et al. |
| 7,965,643 B1 | 6/2011 | Gilbert et al. |
| 8,015,327 B1 | 9/2011 | Zahavi et al. |
| 8,166,458 B2 | 4/2012 | Li et al. |
| 8,291,079 B1 | 10/2012 | Colton et al. |
| 8,306,195 B2 | 11/2012 | Gardner et al. |
| 8,341,462 B2 | 12/2012 | Broda et al. |
| 8,448,148 B1 | 5/2013 | Kolawa et al. |
| 8,464,224 B2 | 6/2013 | Dulip et al. |
| 8,479,122 B2 | 7/2013 | Hotelling et al. |
| 8,510,600 B2 | 8/2013 | Gardner et al. |
| 8,583,777 B1 | 11/2013 | Boyle et al. |
| 9,015,348 B2 | 4/2015 | Hofmann et al. |
| 9,015,654 B2 | 4/2015 | Kaasila et al. |
| 9,021,362 B2 | 4/2015 | Broda et al. |
| 9,154,611 B1 | 10/2015 | Jackson et al. |
| 9,229,842 B2 | 1/2016 | Broda et al. |
| 9,251,035 B1 | 2/2016 | Vazac et al. |
| 9,436,579 B2 | 9/2016 | Broda et al. |
| 9,450,834 B2 | 9/2016 | Broda et al. |
| 9,491,248 B2 | 11/2016 | Broda et al. |
| 9,495,473 B2 | 11/2016 | Gardner et al. |
| 9,720,569 B2 | 8/2017 | Gardner et al. |
| 9,990,110 B1 | 6/2018 | Lounibos et al. |
| 10,037,393 B1 | 7/2018 | Polovick et al. |
| 2002/0107826 A1 | 8/2002 | Ramachandran et al. |
| 2002/0138226 A1 | 9/2002 | Doane |
| 2002/0147937 A1 | 10/2002 | Wolf |
| 2003/0074161 A1 | 4/2003 | Smocha et al. |
| 2003/0074606 A1 | 4/2003 | Baker |
| 2003/0109951 A1 | 6/2003 | Hsiung et al. |
| 2003/0195960 A1 | 10/2003 | Merriam |
| 2004/0010584 A1 | 1/2004 | Peterson et al. |
| 2004/0039550 A1 | 2/2004 | Myers |
| 2004/0059544 A1 | 3/2004 | Smocha et al. |
| 2004/0064293 A1 | 4/2004 | Hamilton et al. |
| 2004/0119713 A1 | 6/2004 | Meyringer |
| 2004/0123320 A1 | 6/2004 | Daily et al. |
| 2004/0205724 A1 | 10/2004 | Mayberry |
| 2005/0102318 A1 | 5/2005 | Odhner et al. |
| 2005/0182589 A1 | 8/2005 | Smocha et al. |
| 2005/0216234 A1 | 9/2005 | Glas et al. |
| 2005/0278458 A1 | 12/2005 | Berger et al. |
| 2006/0031209 A1 | 2/2006 | Ahlberg et al. |
| 2006/0075094 A1 | 4/2006 | Wen et al. |
| 2006/0229931 A1 | 10/2006 | Fligler et al. |
| 2006/0271700 A1 | 11/2006 | Kawai et al. |
| 2007/0143306 A1 | 6/2007 | Yang |
| 2007/0232237 A1 | 10/2007 | Croak et al. |
| 2007/0282567 A1 | 12/2007 | Dawson et al. |
| 2007/0283282 A1 | 12/2007 | Bonfiglio et al. |
| 2008/0059947 A1 | 3/2008 | Anand et al. |
| 2008/0066009 A1 | 3/2008 | Gardner et al. |
| 2008/0140347 A1 | 6/2008 | Ramsey et al. |
| 2008/0147462 A1 | 6/2008 | Muller |
| 2008/0189408 A1 | 8/2008 | Cancel et al. |
| 2009/0077107 A1 | 3/2009 | Scumniotales et al. |
| 2009/0210890 A1 | 8/2009 | Tully |
| 2009/0271152 A1 | 10/2009 | Barrett |
| 2009/0300423 A1 | 12/2009 | Ferris |
| 2010/0023867 A1 | 1/2010 | Coldiron et al. |
| 2010/0057935 A1 | 3/2010 | Kawai et al. |
| 2010/0115496 A1 | 5/2010 | Amichal |
| 2010/0198960 A1 | 8/2010 | Kirschnick et al. |
| 2010/0250732 A1 | 9/2010 | Bucknell |
| 2010/0251128 A1 | 9/2010 | Cordasco |
| 2010/0332401 A1* | 12/2010 | Prahlad .............. G06F 17/302 705/80 |
| 2010/0333072 A1 | 12/2010 | Dulip et al. |
| 2011/0066591 A1* | 3/2011 | Moyne .............. G06F 17/30486 707/610 |
| 2011/0066892 A1 | 3/2011 | Gardner et al. |
| 2011/0119370 A1 | 5/2011 | Huang et al. |
| 2011/0130205 A1 | 6/2011 | Cho et al. |
| 2011/0202517 A1 | 8/2011 | Reddy et al. |
| 2011/0282642 A1 | 11/2011 | Kruger et al. |
| 2011/0296108 A1* | 12/2011 | Agrawal .............. G06F 17/3048 711/118 |
| 2012/0017165 A1 | 1/2012 | Gardner et al. |
| 2012/0017210 A1 | 1/2012 | Huggins et al. |
| 2012/0023429 A1 | 1/2012 | Medhi |
| 2012/0101799 A1 | 4/2012 | Fernandes |
| 2012/0166634 A1 | 6/2012 | Baumback et al. |
| 2012/0246310 A1 | 9/2012 | Broda et al. |
| 2012/0314616 A1 | 12/2012 | Hong et al. |
| 2012/0324101 A1 | 12/2012 | Pecjack et al. |
| 2013/0031449 A1 | 1/2013 | Griffiths et al. |
| 2013/0097307 A1 | 4/2013 | Vazac et al. |
| 2013/0116976 A1 | 5/2013 | Kanemasa et al. |
| 2013/0166634 A1 | 6/2013 | Holland et al. |
| 2013/0205020 A1 | 8/2013 | Broda et al. |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |
| 2015/0222494 A1 | 8/2015 | Broda et al. |
| 2015/0319071 A1 | 11/2015 | Kaasila et al. |

OTHER PUBLICATIONS

Chester et al. "Mastering Excel 97", 1994, Sybex, 4th Ed., pp. 1016, 136-137, 430, 911, 957-958.
Malan et al. "An Extensible Probe Architecture for Network Protocol Performance Measurement", IEEE, Oct. 1998, pp. 215-227.
Jamin et al. "A Measurement-Based Admission Control Algorithm for Integrated Service Packet Networks", IEEE, 1997, pp. 56-70.
U.S. Appl. No. 15/862,503.
U.S. Appl. No. 14/668,928.
U.S. Appl. No. 15/066,969.
U.S. Appl. No. 15/155,185.
U.S. Appl. No. 15/441,718.
U.S. Appl. No. 15/449,061.
U.S. Appl. No. 15/591,353.
U.S. Appl. No. 15/668,002.

* cited by examiner

US 10,346,431 B1

SYSTEM AND METHOD FOR AUTOMATED RUN-TME SCALING OF CLOUD-BASED DATA STORE

TECHNICAL FIELD

The present disclosure relates generally to cloud computing and cloud data storage; more particularly, to automated systems and methods for storing large amounts of real user measurement (RUM) performance data, while providing very fast access to the data for real-time, actionable business analytics.

BACKGROUND

Web analytics has become increasingly important as a tool for business intelligence, market research, and for improving the effectiveness of a website or application. In today's business world, revenue often depends on millisecond performance of a website or web application. Businesses and application owners are therefore interested in measuring real users' behaviors and experiences to understand how mobile application and web performance impact the revenue generated for their business. In response to this need, commercial products and services have been developed that measure, collect, and analyze performance data obtained directly from web and mobile users. These products and services may also help correlate the RUM data with critical business metrics in order to better understand and optimize web and application usage. By way of example, mPulse™ is a cloud-computing product offered by SOASTA® of Mountain View, Calif. that allows a business to collect and analyze all of a customer's real user data in real-time. The data collected is stored in the cloud, which allows the business customer to access and analyze large amounts of historical data to spot trends and gain business insights.

Web data analytics companies and the products they offer typically rely upon one or more web services that allows users to rent computers (referred to as "instances") on which to run their own computer applications. Often times, the web service provides block level cloud storage volumes for use with the cloud-computing instances. In a typical architecture, a single machine instance may be connected to receive RUM data from multiple geographic locations, perform read/write services, and database management. A storage area network (SAN) connected to and accessible to the single instance provides large capacity disk array storage for all of the RUM data across multiple business customers. In this cloud-based data storage architecture, performance bottleneck, I/O throughput, and storage capacity problems can arise as the data becomes increasingly larger over time due to business growth, increased website traffic, and the addition of new customers using the analytics service. For example, a customer may want to access and run analytics on their RUM data collected over the past 30 days (which may involve a hundred or more queries accessing millions or even billions of data points). Performance problems inherent in the traditional cloud-based data storage architecture may cause the customer to experience delays lasting several minutes or longer before the system returns the analytics desired by the customer. Furthermore, system performance problems experienced by one customer can also create poor user experience for other customers who use the same system.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
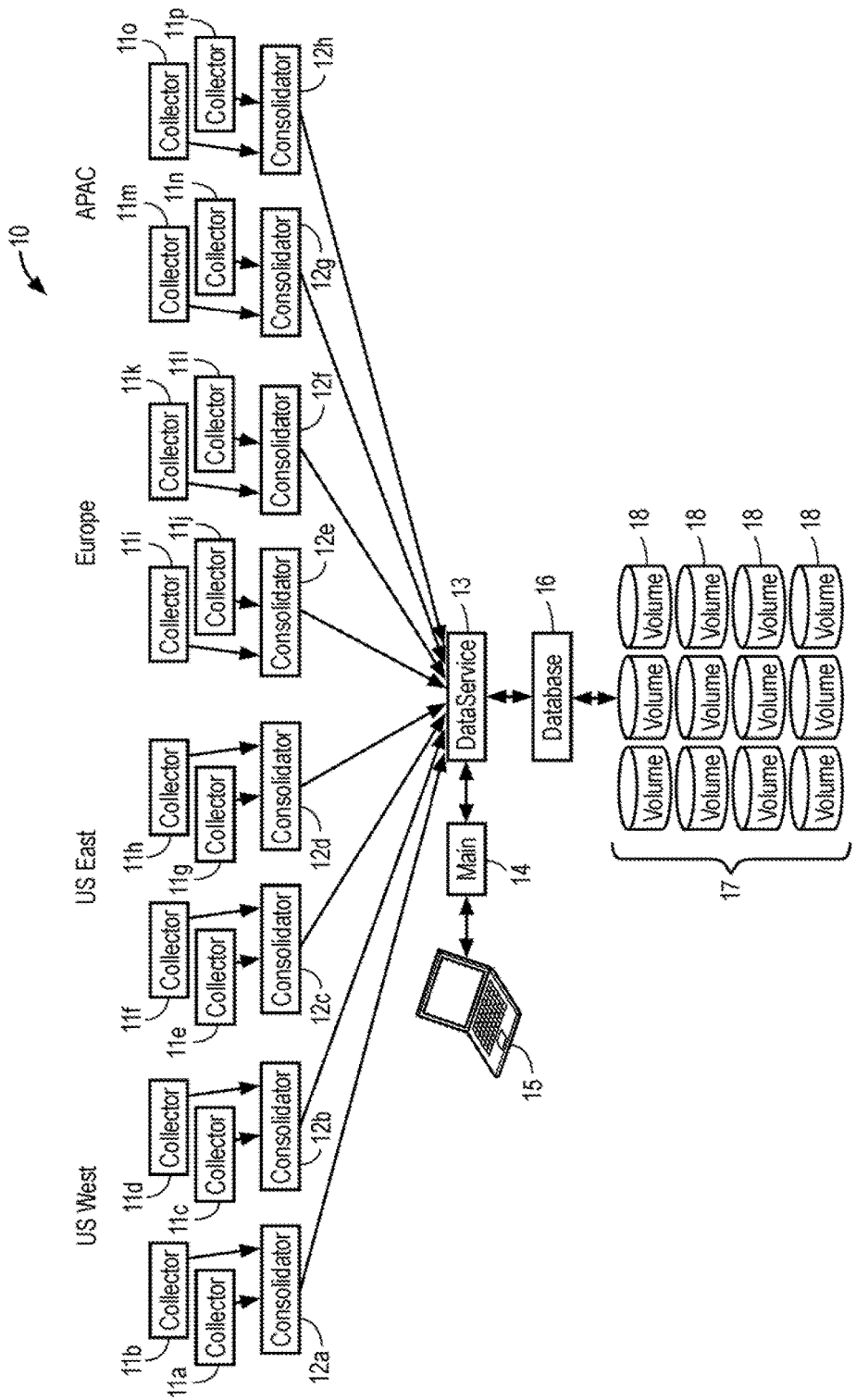
FIG. 1 is an example architectural diagram illustrating a computing platform that captures performance and business metrics from real user measurements.

In the following description specific details are set forth, such as data types, number generating methods, calculations, process steps, etc., in order to provide a thorough understanding of the subject matter disclosed herein. However, persons having ordinary skill in the relevant arts will appreciate that these specific details may not be needed to practice the present invention.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or method steps may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers (servers) on which to run their own computer applications, thereby allowing scalable deployment of applications through which a user can create a virtual machine (commonly known as an "instance") containing any software desired. Instances are virtual computing environments. Amazon Elastic Block Store (EBS) provides block level storage volumes for use with EC2 instances. EBS volumes are well-suited for use as the primary storage for file systems and databases. Amazon EBS is particularly useful for database-style applications that frequently require random reads and writes across the data set.

The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure.

In the present disclosure, database "sharding" refers to a horizontal partition (i.e., a table) of data in a database. Each individual partition is referred to as a shard. Each shard may be held on a separate database server or volume instance to spread the load. Data striping, as that term is used in this disclosure, is the technique of segmenting logically sequential data, such as a file, so that consecutive segments are stored on different physical storage devices.

A "data store" is a repository of a set of data objects. A data store may be considered synonymous with a database, which can be implemented on storage devices such as disk arrays, e.g., a Redundant Array of Independent Disks (RAID), SANs, tape libraries, optical memory, solid-state memory, etc.

A "snapshot" is an incremental backup of an Amazon or other EBS volume, which means that only the blocks on the device that have changed after the most recent snapshot are saved. When a snapshot is deleted, only the data exclusive to that snapshot is removed. After writing to an Amazon EBS volume a user can periodically create a snapshot of the volume to use as a baseline for new volumes or for data backup. A new volume begins as an exact replica of the original volume that was used to create the snapshot.

The term "server" broadly refers to any combination of hardware or software embodied in a computer (i.e., a machine instance) designed to provide services to client devices or processes. A server therefore can refer to a computer that runs a server operating system from computer-executable code stored in a memory, and which is provided to the user as virtualized or non-virtualized server; it can also refer to any software or dedicated hardware capable of providing computing services.

In the context of the present disclosure, "collector servers" are servers deployed and used to receive real-user measurement data sent from a user's client device. Collector servers may also download configuration file information containing current metric and/or timer definitions to client devices responsive to polling requests sent by the client devices. Each collector server may process and aggregate the data items received. Processing may include statistical calculations, such as computing mean, average, standard deviation, and other relevant analytics/metrics.

"Consolidators" are servers deployed and utilized in a hierarchical manner to accumulate and aggregate the data and received from the collectors. Consolidators may also perform further statistical calculations on the aggregated data. The consolidators are typically configured to stream the further aggregated data and statistics to a Data Service instance that stores a final aggregated set or array of data results and analytics/metrics in one or more databases accessible to a computer or main instance. The main instance may generate an analytic dashboard in real-time from the final aggregated set or array of data results and analytics/metrics.

The term "real-time" refers to a level of computer responsiveness that a user senses as sufficiently immediate or that enables the computer to keep up with some external process (for example, to present visualizations of real user measurements as it constantly changes). Thus, real-time is a mode of computer operation in which the computer collects data, analyzes or computes with the data, reports (e.g., visually displays) and/or stores the results nearly simultaneously, e.g., within a few seconds or even milliseconds. "Run-time" denotes the time period during which a computer program is executing.

In the context of the present disclosure, the term "beacon" refers to data related to a real user's experience on a particular website, web application, or mobile application collected by a library running on the browser of a client device, and sent to a server (e.g., a collector server) via Hypertext Transfer (or Transport) Protocol (HTTP), or some other protocol. In the case of a mobile app, the data gathered may be based on definitions contained in a configuration file that is periodically downloaded to the mobile device running the mobile app. For example, every user who runs a particular mobile app on their mobile device may also automatically download a configuration file every few minutes that defines the various metrics and/or timers to be gathered and beaconed back to a server from the user's mobile device in real-time as the user runs or uses the mobile app. In the case of a website, the library may be a JavaScript library running on the browser of a client device.

The server receiving the beacon information may aggregate that data, (and also perform certain statistical calculations on the received data) along with similar data received from other users accessing the same website, web application, or mobile application. Any HTTP headers sent by the browser as part of the HTTP protocol may also be considered part of the beacon. A beacon may therefore be thought of as a page view on a website or application, but without a corresponding page. For every user who visits a particular website or application, a program, library or configuration file running the library on the user's client device measures various metrics and records data that is then sent or "beaconed" back to a collection server in real-time as the user navigates through or uses the website or application.

In one embodiment, a system and method allows scaling of cloud-based data stores in run-time to provide substantially improved 110 throughput and greatly expanded disk storage capacity in a cloud-computing product/service that allows a business to collect and analyze data beacons from real users of their website or application in real-time. In one embodiment, a software program or computer program product is provided that produces the analytic dashboard for a user or business customer to graphically display selected analytics and metrics. In another embodiment a graphical user interface (GUI) is provided on the dashboard that allows a user or customer to quickly and automatically scale and expand database storage capacity through a single operational (e.g., "right-click") input from a mouse or other input device.

Conceptually, the computer-implemented operations performed are analogous to the biological process of meiosis. Data meiosis, in the context of the present disclosure, may be considered as broadly referring to a type of data replication or copying, wherein a single database or data store may be copied to create up to N additional databases, where N is a positive integer. A subsequent operation may compact each of the databases in the resulting set of databases, to remove part of the data in them, thereby greatly expanding the overall storage capacity. The throughput of the system is greatly expanded by the replication operation since queries can be executed in parallel on all of the N data stores.

FIG. 1 is an example architectural diagram illustrating a computing platform 10 that captures performance metrics from real user measurements in accordance with one embodiment. A plurality of collector servers 11 are shown distributed across four different geographical regions of the globe. A first set of collectors 11a-11d are distributed across the Western United States; a second set of collectors 11e-11h are shown distributed across the Eastern United States; a third set of collectors 11i-11l are distributed across Europe; and a fourth set of collectors 11m-11p are distributed across the Asia-Pacific (APAC) region of the globe. It is appreciated that the actual number of collectors 11 across any geographical region may vary in number and any geographic region of the world may be included in architectural platform 10.

Each of the collectors 11 captures data metrics from real users around the world who are actually visiting a website, or using a web application or a mobile app. In one embodiment, metrics such as page load times may be beaconed to collectors 11 on a predetermined time interval, e.g., every 100 ms. Collectors 11 receive and terminate beacon data received from the user client devices, process the beacon data, and then send the data results to an associated consolidator server 12. The data periodically (e.g., every 1-5 seconds) transmitted from collectors 11 to consolidators 12 may include the raw RUM data (e.g., page load time) as well as statistical results computed by the collectors (e.g., average load time, median load time, standard deviation, etc.)

Consolidators 12 are also distributed by geography. For instance, the example of FIG. 1 shows consolidators 12a-12b being located in the Western United States; consolidators 12c-12d being located in the Eastern United States; consolidators 12e-12f are located in Europe; and consolidators 12g-12h are in APAC. Consolidators 12 further aggregates the RUM performance data and metrics received from a set of collectors in the same region. In this example, each consolidator is connected to receive data from a pair of collectors. Other configurations may have individual consolidators receiving and aggregating data from more or fewer collectors.

It is appreciated that each of the collectors 11 and consolidators 12 shown in FIG. 1 are provisioned in the cloud each as a separate machine instance. In one embodiment, each collector and consolidator shown in FIG. 1 is an Amazon EC2 instance. Practitioners in the art will appreciate that a variety of other computing cloud services may be utilized to provide virtual computing environments which implement the functional computing and storage devices shown in the Figures.

Each consolidator 12 forwards their aggregated data and metrics to a Data Service 13. Data Service 13 is a machine instance which, in one embodiment, implements a Java process for writing/reading data to/from one or more databases. Data Service 13 also implements a shard manager that partitions data stored in a database and executes algorithms for mapping historical data to produce a shard map. As shown, Data Service 13 is connected to a Database 16. Database 16 is a machine instance that provides a file system with read/write access to data store 17, which comprises a plurality of data storage volumes 18 used to store the aggregated historical data beacons and results collected from the real users of a customer's website or application.

It is appreciated that data store 17 may be configured to store data from multiple customers collected over many months or even years. In one embodiment, data store 17 is implemented in a Redundant Array of Independent Disks (RAID) provisioned in the cloud through Amazon Elastic Block Store (EBS) service. The data in each of the storage volumes 18 is available to a main computer instance 14, which is shown connected to Data Service 13. Main instance 14 may execute a program that generates an analytic dashboard having a graphical user interface that allows a user or customer to retrieve historical data from data store 17, and perform a variety of business and performance analytics on the data. In the embodiment shown, the analytic dashboard provides a graphical user interface displayed on a client device or computer 15 (e.g., a laptop).

In FIG. 1 main instance 14 is a virtual machine deployed on a server provided in the cloud. Main instance 14 communicates with a browser application running on computer 15. In one embodiment, main instance 14 may also execute a computer program that deploys the Real User Measurement (RUM) grid, which comprises a hierarchical configuration of collectors 11 and consolidators 12 servers, as well as controlling the capture and consolidation of RUM data. Main instance may also execute code for performing real-time analytics on the historical data retrieved from data store 17.

Persons of skill in the art will understand that each EC2 instance is currently configured to have a maximum I/O throughput of 48K input/output operations per second (IOPS), which is a limitation on the speed of queries made to the historical data stored in volumes 18 of data store 17. A typical analytical session may comprise hundreds of queries to retrieve tens or hundreds of billions of data beacons stored in the database.

In one embodiment, an automated process is initiated through a single operational (e.g., "right-click") input from a mouse or other input device by a user of computer 15, which process results in an immediate replication of database 16 and data store 17. A GUI generated by main instance 14 allows a user or customer to create up to N additional databases 16 and data stores 17, where N is a positive integer. Each of the newly created databases 16 and data stores 17 is a copy or clone of the original, which means that each of the newly created volumes 18 contains the exact same historical data of the original volumes. In one implementation, the replication of database volumes is implemented by taking an EC2 snapshot of the original volumes. Through the GUI provided, a user selects the database to be replicated and inputs a number indicating the number of additional database copies to be made.

Figure 2:
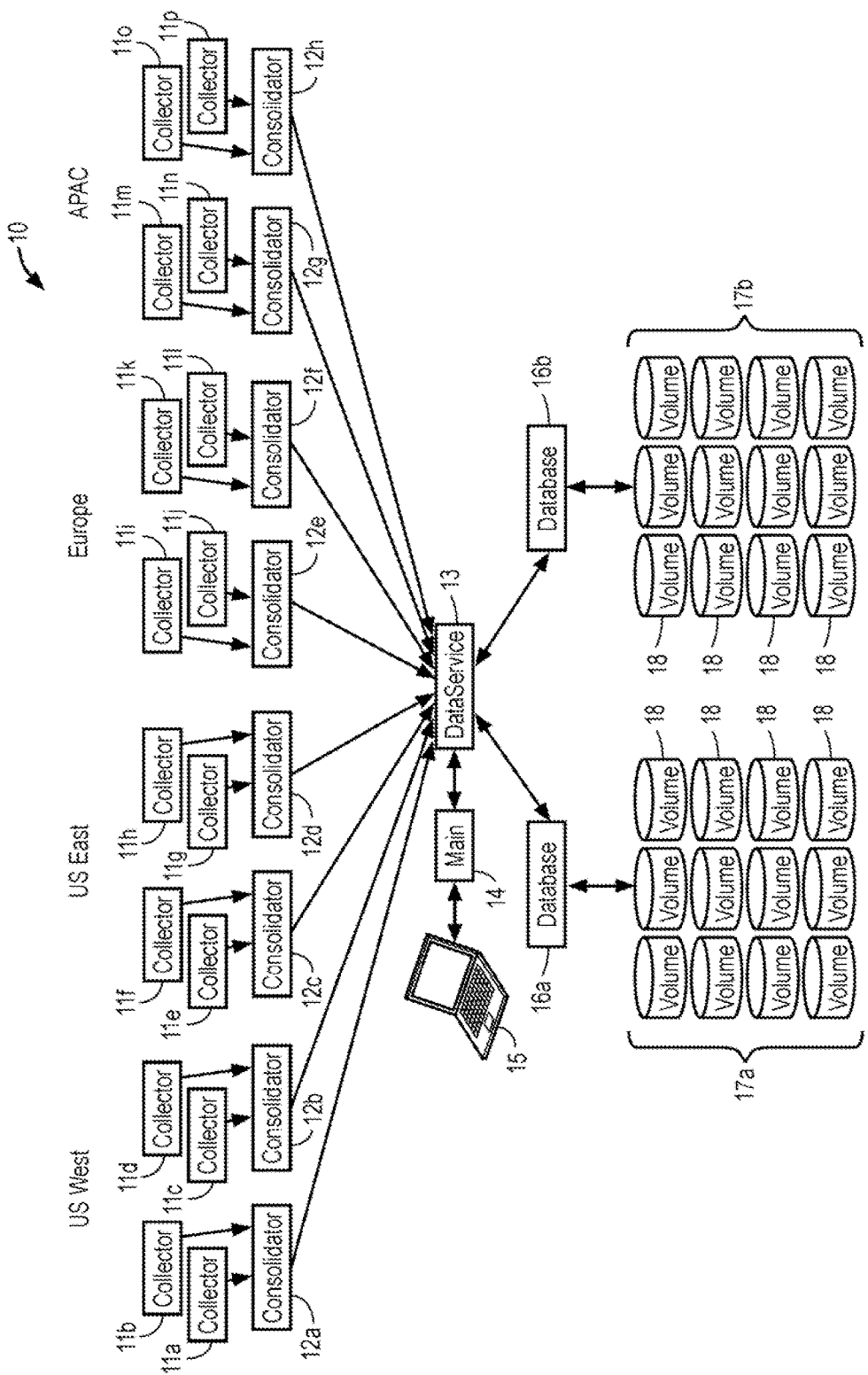
FIG. 2 shows the example architectural diagram of FIG. 1 after an automated database replication operation that has scaled the number of databases by a factor of two.

FIG. 2 shows the example architectural diagram of FIG. 1 after an automated database replication operation wherein a user has replicated the original database through a single right-click operation of the user interface available through the browser running on laptop computer 15. As shown, the replication or splitting operation has created a second database instance 16b and second data store 17b to go along with original database 16a and original data store 17a. Note that after snapshot replication, each of the volumes 17b contains the exact same data as found in data store 17a.

Persons of skill will appreciate that the snapshot replication of the volumes 18 occurs virtually instantaneously and does not involve computationally intensive I/O operations where data is moved between volumes or written into the new volumes. Because the snapshot replication of the database volumes is instantaneous, it may occur during run-time. The RAID volumes 18 of data store 17 are momentarily frozen during the replication process. During the freeze, new data beacons that were about to be written are buffered for a few seconds until the snapshot is taken. Then new sets of the new volumes 18 are created, new instances of database 16 are provisioned, and all of the new volumes 18 are attached to the new database 16, while data continues to be written to the original database.

After all of the new data stores have been fully provisioned, an algorithm is executed that maps the location of all of the historical data for each customer across all of the databases (original plus the newly-created ones). In one embodiment the historical data is mapped across the databases by date according to a round-robin algorithm. For instance, in the example of FIG. 2 where there are now two identical databases created, a given customer's historical data obtained on January $1^{st}$ may be mapped to a location in data store 17a, data from January $2^{nd}$ mapped to a location in data store 17b, January $3^{rd}$ into data store 17a, January $4^{th}$ mapped into data store 17b, and so on. Practitioners in the art will appreciate that this type of round-robin partitioning of the data by date (which is akin to orderly dealing cards to players seated at a table) optimizes the system for read performance, since historical data from a given time period is retrieved on an essentially equal basis from among all of the databases. In other words, data is split or striped in order by date. This means that when a customer or use retrieves historical data from any given time period (e.g., 30 days) all of the data stores will be accessed equally for the fraction of the data they hold.

In one embodiment, execution of the mapping algorithm is a Java program that executes in Data Service 13, with each mapping managed by the "shard manager". It should be understood that mapping does not move data from one database location to another. Rather, mapping tells Data Service 13 which database location it should retrieve data for a given customer for a given date. In other words, mapping tells the Java process running on Data Service 13 that if a query to retrieve the data for customer X written 3 days ago, it can found at the mapped location of a particular database.

Note that in one implementation, mapping is performed for all customers across all the data stored since the customer began using the system. Before a mapping change occurs, any query that comes into the system goes to the original data store(s). After the mapping change, any query is optimized by accessing data from all of the data stores. This entire process happens in run-time and there is no need to stop the system or take it offline to add more data stores or to perform the sharding algorithm for historical mapping. All of the queries always go through the shard manager, so queries that started before the addition of new data stores just use the existing data stores. Queries that start after new data stores have been added use all of the new set of data stores.

Persons of skill in the art will understand that this disclosed solution of scaling data has significant advantages over existing data scalability solutions used by Structured Query Language (SQL) and Not SQL (NoSQL) databases. Those existing solutions focus on adding a database node to the cluster, and then all of the other databases send some of their data to that database. This sending and receiving of data, and then deleting that received data from each of the databases, is very costly in terms of performance. While all of this sending, receiving and deleting is happening, the performance of the entire cluster goes down significantly, which affects reading (queries performance) and writing (keeping up with real-time data streams). The presently disclosed solution is better because the taking of snapshots is virtually free in terms of performance. Replica data stores are created from the snapshots without affecting the performance of the main data stores. After replication, the data in the shard manager is mapped across all of the data stores.

After database replication and mapping, a user or customer may optionally perform another single GUI right-click operation, referred to as data compaction, which drops data tables from all of the databases, resulting in greatly increased available disk space. In the compaction operation, rather than deleting rows form tables, whole tables are simply dropped. Deleting rows is very expensive in terms of performance, while dropping whole tables is virtually free, and therefore can be done in run-time.

Figure 3:
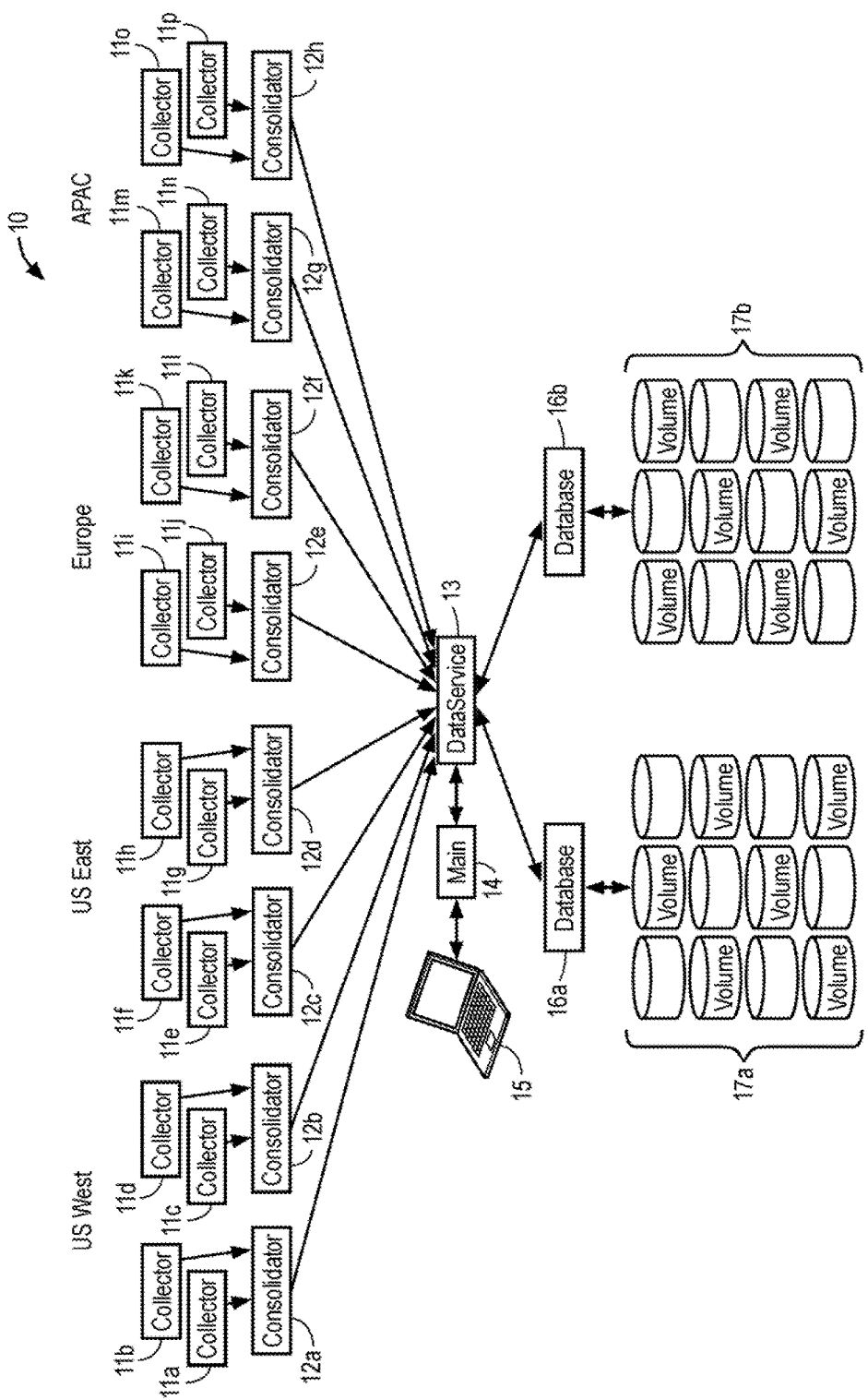
FIG. 3 shows the example architectural diagram of FIG. 2 after a data compaction operation.

FIG. 3 shows the example architectural diagram of FIG. 2 after a data compaction operation. As shown, one-half of the data has been dropped from each data store 17a & 17b as a result of the compaction process. Although FIG. 3 shows blank volumes in each data store 17a & 17b, it should be understood that entire volumes are not completely cleared out; instead, a certain portion of content (data tables) is dropped from each volume.

Figure 4:
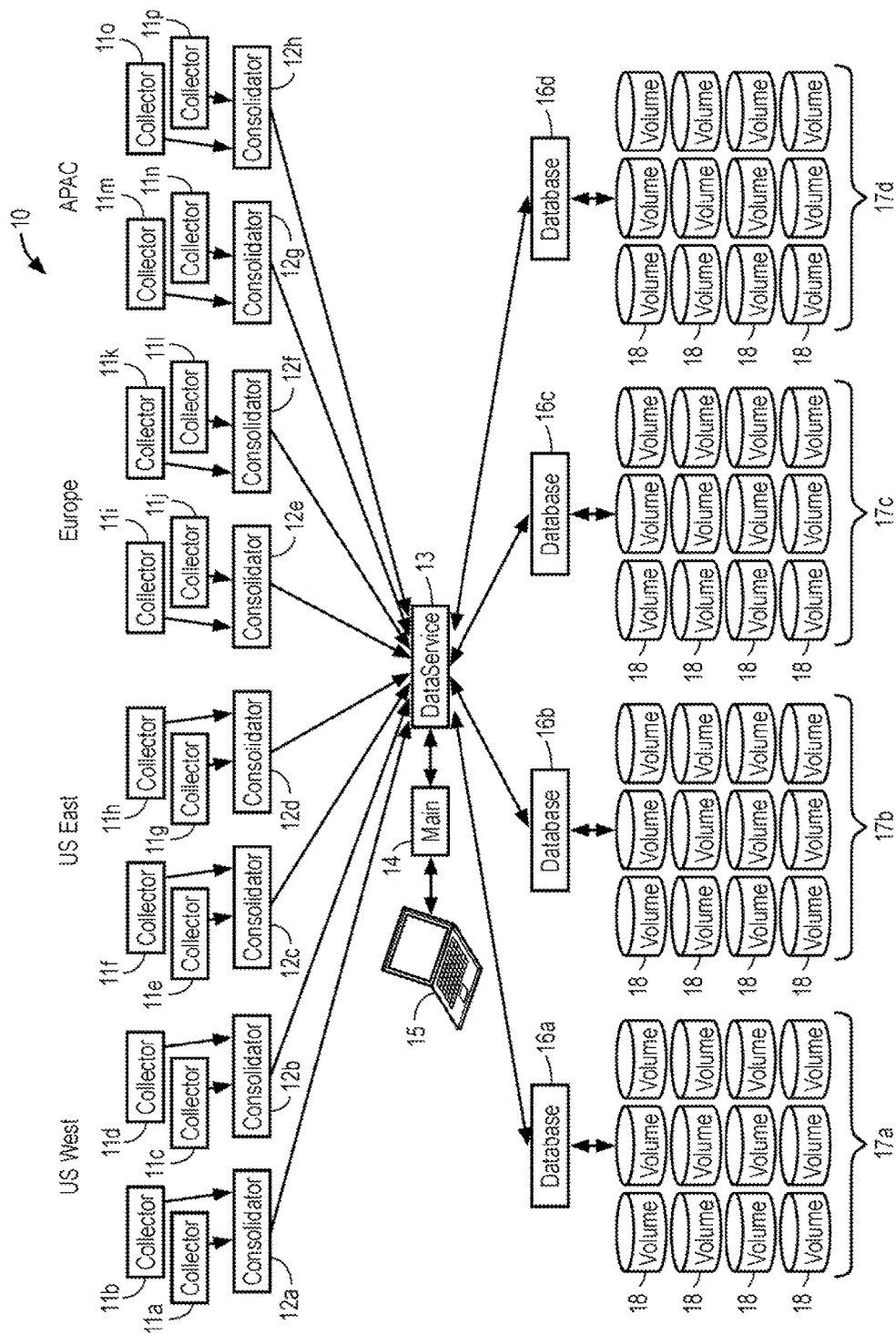
FIG. 4 shows an example architectural diagram after a database replication operation that has scaled the number of databases by a factor of four.
Figure 5:
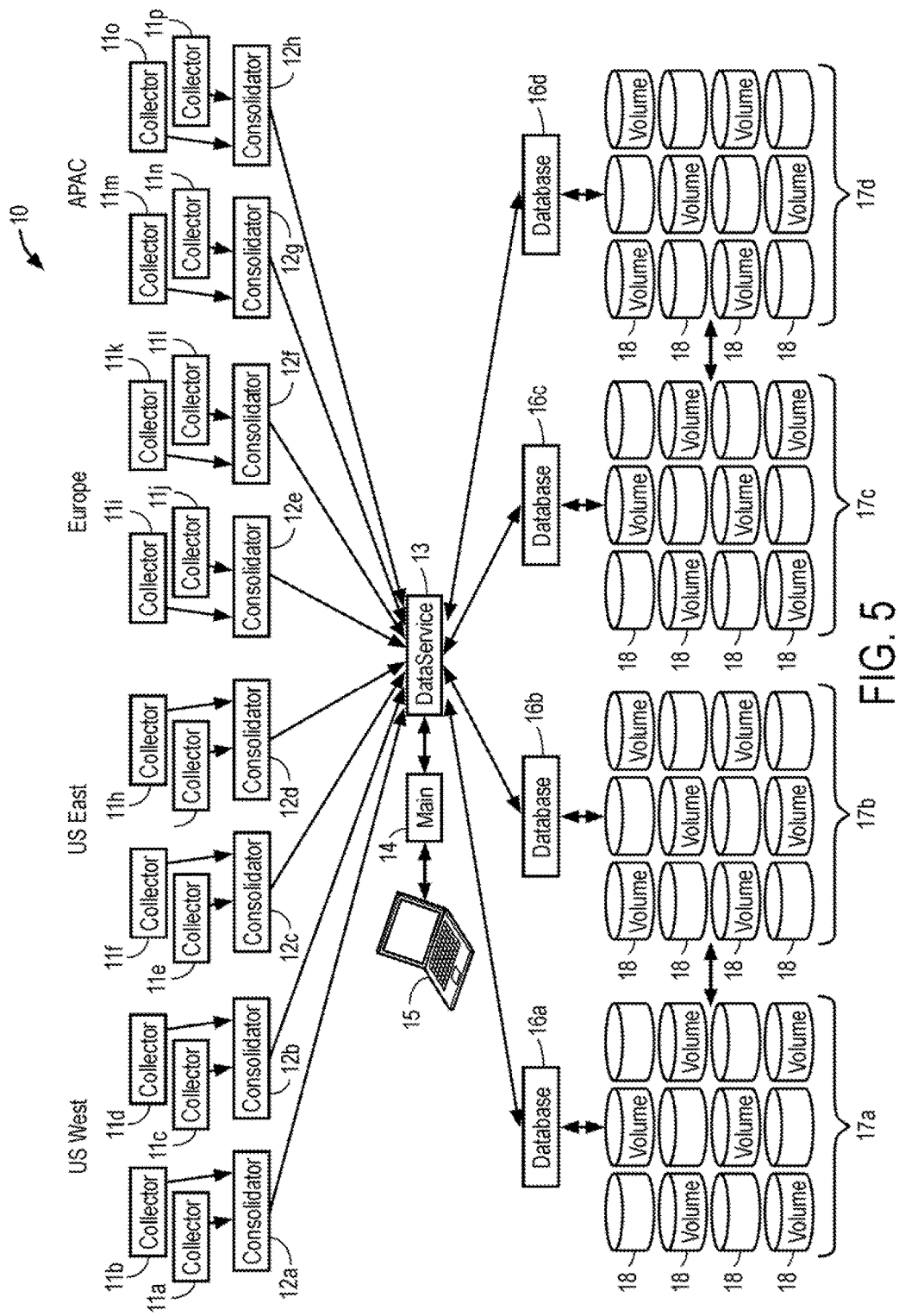
FIG. 5 shows the example architectural diagram of FIG. 4 after a data compaction operation.

The example of FIG. 4 shows computing platform 10 after a replication operation that results in a set of four databases 16a-16d, with attached data stores 17a-17d, each having identically created volumes 18. FIG. 5 shows the example architectural diagram of FIG. 4 after a data compaction operation. In one embodiment, compaction drops (n−1)/n, where n=4 (n is the total number of databases after replication), of the data content from each of the four data stores 17. The newly freed disk space can be used to store new data beacon data for existing customers, or to provide storage for new customers.

The compaction operation is extremely fast, and can be performed, in one embodiment, by a single UI (right-click) operation during run-time because it does not involve moving data or erasing rows from data tables, which is computationally expensive. The compaction operation simply drops data tables by wiping out addresses.

Figure 6:
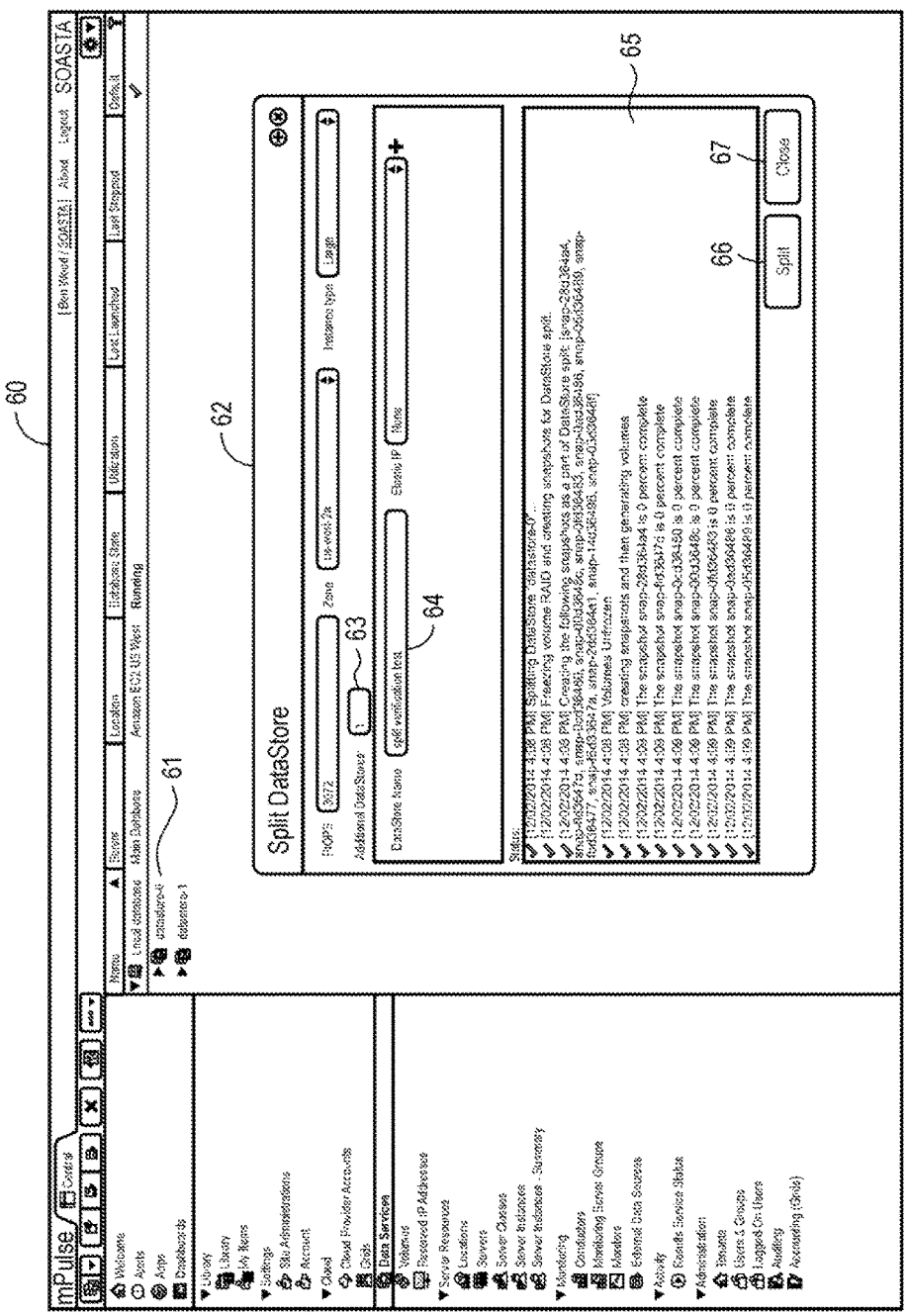
FIG. 6 is an example user interface window of an analytic dashboard showing a single right-click operation for performing database replication or splitting.

FIG. 6 is an example user interface window 60 of an analytic dashboard showing a single right-click operation for performing database replication, which is also referred to as splitting. In this example, a user has selected an existing database 61 (i.e., datastore-0) to be replicated. A right-click of a mouse allows the user to automatically launch a "Split DataStore" UI widget or window 62. As shown, window 62 permits the user to enter a new data store name in field 64 and specify the number of additional data stores in input field 63. Clicking on the "Split" button 66 initiates the automated operations of taking the latest snapshot of the selected existing data store, provisioning of the new database and new volumes of the data store, attaching the new database/data store to the main instance, and execution of the mapping algorithm of the shard manager which maps all of the historical data to the original and replicated data stores. In one embodiment the mapping is persisted to a repository, which is a separate database running on the main instance. The sequence of operations for the replication or split operation is shown in real-time in status field 65. After the split operation has completed, the user may close window 62 by clicking on button 67. At this point, all of the data present in the original data store is now present in all of the newly created data stores, i.e., a new set of databases.

In one embodiment, a user or customer may replicate any number of the existing data stores, a subset of the data stores, or a single data store, N times, where N is a positive integer.

Figure 7:
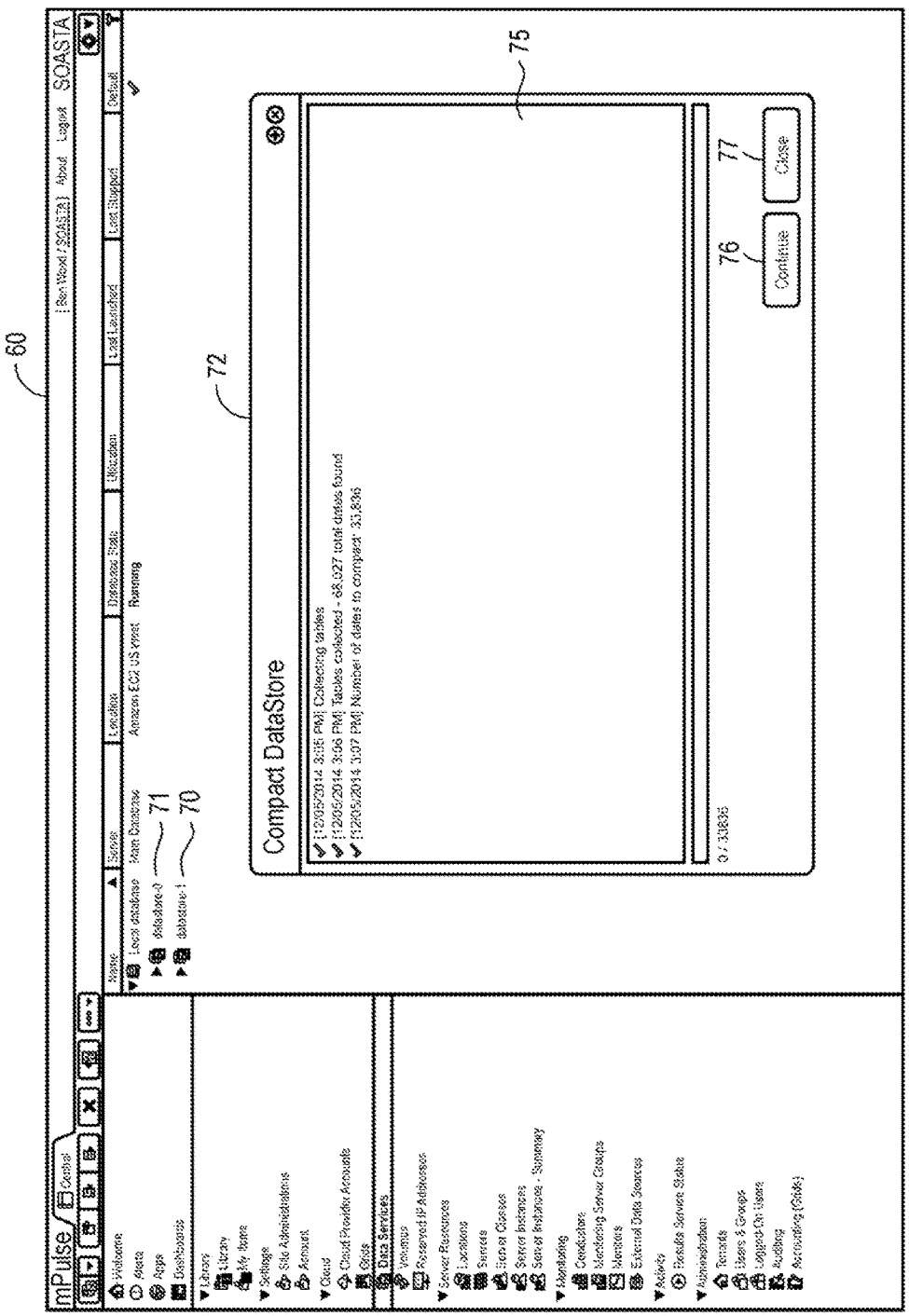
FIG. 7 is an example user interface window of an analytic dashboard showing a single right-click operation for performing database compaction.

FIG. 7 is an example user interface window 60 of an analytic dashboard showing a single right-click operation for performing database compaction. In this example, a user may select either or both existing databases 70 & 71 (i.e., datastore-1 & datastore-0) for compaction. A right-click of a mouse allows the user to automatically launch a "Compact DataStore" UI widget or window 72. As shown, window 72 permits the user to commence the compaction process for the selected database(s) by clicking on the "Continue" button 76. Once the process begins, that status of the operations performed is shown in text field 75. In this example, text field 75 shows that the automated process has collected all of the data tables; indicated that 68,027 total dates were found for the corresponding tables; and further indicated the number of dates to compact, i.e., 33.836. After the compaction process has completed, the user may close window 72 by clicking on button 77. After compaction, the storage capacity in each of the databases has been effectively doubled through the process of dropping data tables for half of the volumes in each data store.

Figure 8:
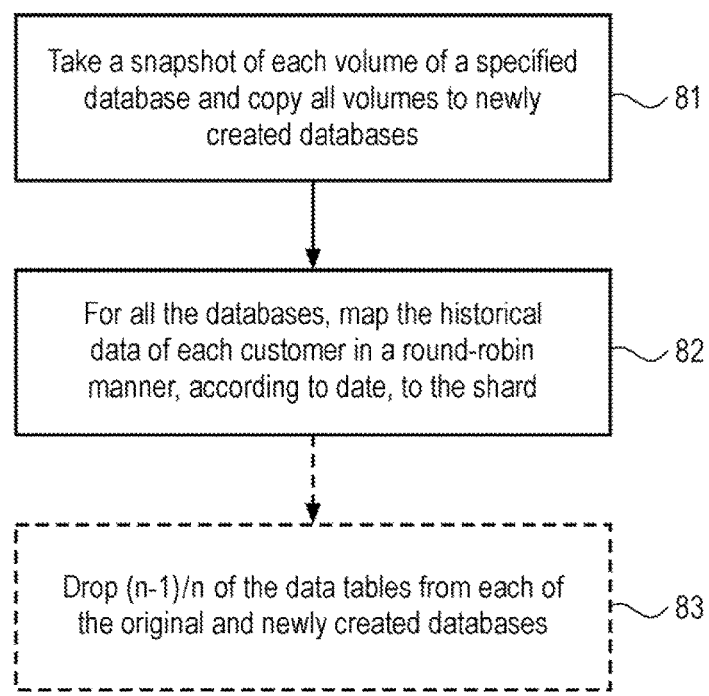
FIG. 8 is a flow diagram showing an example method for automated replication and compaction of a cloud data storage system.

FIG. 8 is a flow diagram showing an example method for automated replication and compaction of a cloud data storage system. In the embodiment shown, the replication process begins with the taking of snapshots of each volume of a specified database, e.g., an Amazon EBS snapshot. (Block 81) A new volume is thus created on each of the snapshots, such that the all of the data stored on the original volumes is now replicated or copied to an identical set of newly provisioned data store volumes attached to a new EC2 database instance. The newly created database(s) may also be attached to a data service instance, and to a main instance.

Next, for all of the databases—both original and newly created—all of the historical data of each customer is mapped according to date according to a round-robin algorithm. (Block 82) In one embodiment, the round-robin algorithm maps data obtained for a first (earliest) date to a location in a first database, data obtained for a next (second) day in a location of the next (second) database, and so on, proceeding in a circular order around all of the available databases. After data for a particular day has been mapped to the last database, the process continues with the mapping of the data for a next date looping back to the first database. The process is akin to dealing cards (data striped by day) to players (databases) seated at a table. The process continues until all of the days of data for a given customer have been mapped among all of the databases. The same mapping process may be repeated for each customer serviced by the system.

Persons of skill will appreciate that the mapping algorithm described in the example of FIG. 8 is an automated process that splits the historical data of a customer equally among the original and newly created databases. This has the advantage of optimizing the system for data reads or queries. The reason why is because all of the historical data is equally split in order by date among a plurality of available data stores. For a data query over any given multi-day time period (e.g., 7 days, 30 days, 90 days, etc.) all of the data stores will be accessed/executed equally for the fraction of the data they hold. Even if the time period in days is smaller (m) than the number of databases (n), there is still a meaningful advantage of parallelizing across n databases instead of reading all of the data from a single database.

The inventors have discovered that the increase in performance of the disclosed system and method is significantly greater than expected. In one experiment, a typical set of queries a certain dashboard executed (involving billions of beacons) over a given time period to a system implemented with a single database took approximately 4 minutes to retrieve the results. After a replication/splitting process which went from 1 to 4 databases, the same set of queries took about 15 seconds. In other words, the increased parallelism achieved by the disclosed embodiments resulted in an improvement in performance greater than two orders of magnitude.

Continuing with the example of FIG. 8, after the historical data has been mapped, the user or customer has the option of performing a compaction operation. The primary reason why a user or customer would elect to perform compaction is need of disk space. The compaction process drops (n−1)/n, where n is the total number of databases after replication, of the data tables from each of the original and newly created databases (Block 83). In other words, since the GUI allows a user to replicate or split from 1 to n databases (data stores), the compaction process drops or deletes (n−1)/n of the data from each data store. Note that the automated process of dropping of data tables is accomplished in an extremely fast manner since data is neither moved, nor actually erased. Instead, dropping of data tables is achieved by deleting files on the file system. Persons of skill in the art will appreciate that deleting files is fast because the operating system can simply mark the space as available.

Figure 9:
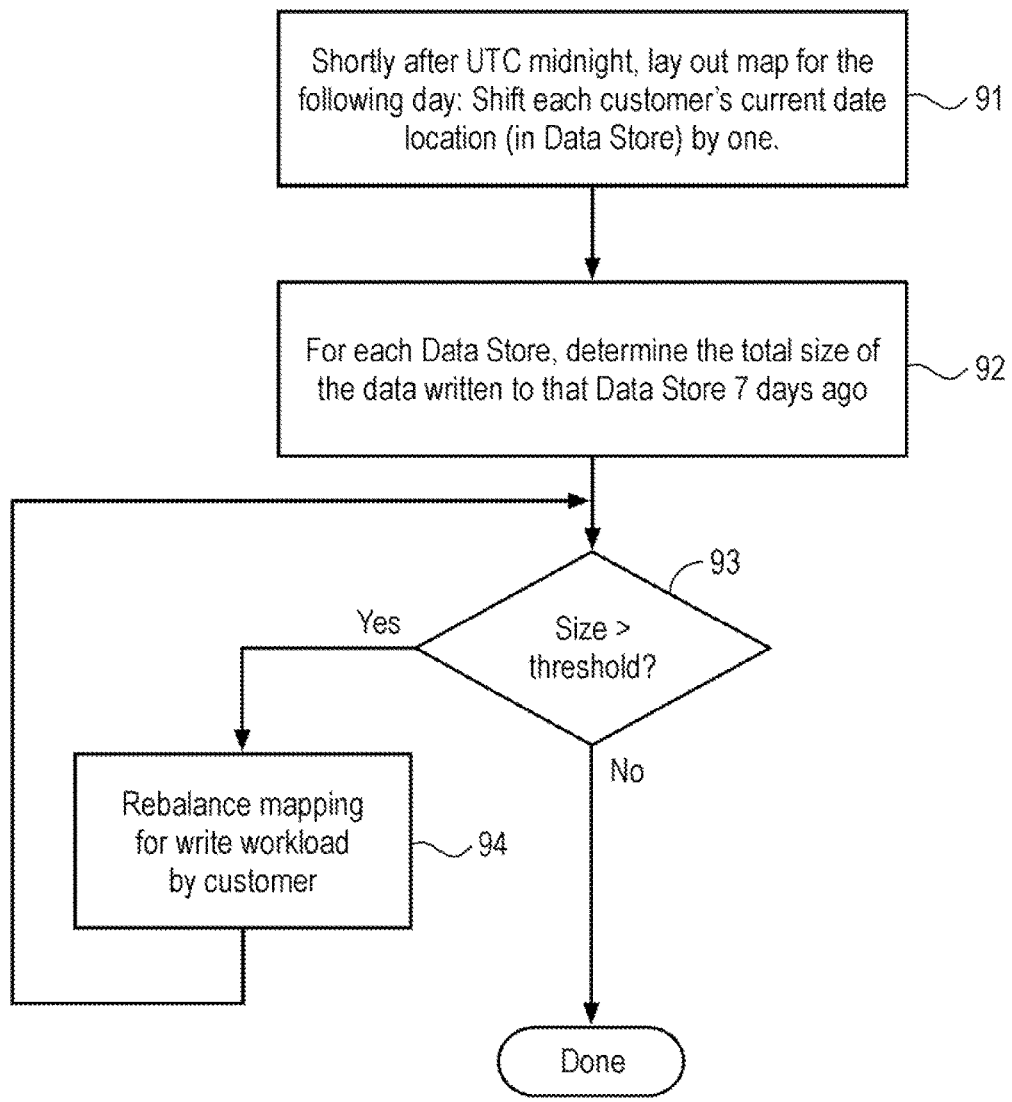
FIG. 9 is a flow diagram showing an example method for mapping future RUM data into a cloud data storage system.

FIG. 9 is a flow diagram showing an example method for mapping future RUM data into a cloud data storage system. In one embodiment, each day shortly after midnight (UTC) an algorithm is executed to determine the mapping for the day, which begins at the following midnight (UTC). The algorithm determines which data store will be used to read and write the tables for each customer for that day, i.e., the future split. New map entries are created in the shard manager essentially 24 hours ahead of time so that when new data begins arriving at midnight, the system knows where (which data store) it is to be written.

The example of FIG. 9 illustrates a two-pass routine in which the data is first striped by date, and then re-balanced if the algorithm predicts that any one data store will be much more heavily written to than the others. In the first pass of the routine the mapping for the following day is the customer's current UTC date location (for the present day) shifted by one. (Block 91) For example, if there are four data stores (DS-0, DS-1, DS-2, and DS-3) and the database location where data beacons are being written for the current day is DS-2, the first pass of the algorithm maps the future split such that starting at midnight, all new beacons received will be written into DS-3. In the absence of other concerns, this produces the ideal configuration for fast reads across multiple days' worth of data, because the maximum number of data stores will be used, in parallel, to complete the task.

The second pass of the algorithm illustrated in the example of FIG. 9 optimizes for write performance based on data size considerations. Over time, as the amount of data for each individual customer grows at disproportionate rates, the write I/O operations may become "imbalanced" such that one data store is writing much more data than the others. The second pass addresses this by "re-balancing" on an "as needed" basis. Each day, for each data store, the algorithm examines the total size of the historical data written to that data store 7 days previously. So, if the current day is a Tuesday, and the algorithm is trying to determine the mapping for Wednesday, the second pass of the algorithm looks at the total amount of data written to the data store the previous Wednesday (Block 92). Stated differently, execution of the mapping algorithm determines the size of the data that was written per customer on the same day of the week that tomorrow will be, a week ago. At this point, the algorithm may sum up all of the data expected to be received on the following day (e.g., Wednesday) from all of the customers, and written to each data store.

At decision block 93 the system determines, for every data store, whether the total amount expected to be written to that data store is within a specific threshold amount above or below the average. In one implementation, the threshold is set at 15% above (or below) an average or mean of the size of the data in the data store(s). If the total amount for each data store is within 15% of the average, then the second pass is complete, and no changes are made to the output produced by the first pass.

On the other hand, if the threshold is exceeded, then the system rebalances the mapping for write workload by customer. (Block 94) Rebalancing is an iterative process, with small changes being made to redistribute some of the write workload as among the plurality of databases. With each change, the algorithm returns to decision block 93 to determine whether the changes made have reduced the size differential to a level that does not exceed the threshold. In certain embodiments, further re-balancing for read performance may occur.

Redistribution may involve creating an ordered list ranking customers in terms of how much data was generated for each. For example, the data striping can be adjusted to get a data store within the threshold limit (e.g., 15%) by mapping the future split such that a smallest customer is mapped to the database with a biggest customer (in terms of write workload) to re-balance the write workload to be within the threshold limit. It is appreciated that other schemes may alternatively be used to achieve rebalancing of the write load to stay within acceptable limits. The goal is to minimize the number of changes made to the mapping produced by the first pass, because each change reduces read parallelism, when a query spans data from multiple days.

In one embodiment, a replica of each data store is maintained in the event of failure. For example, the data store infrastructure may reside in a first geographic location (e.g., Portland) with a replica of each data store being maintained at that same geographic location. In another implementation, the replica data stores may be maintained at a remote geographic location. In yet another embodiment, a first replica set of data stores may be in the same geographic location as the working set of data stores, with a second replica set of data stores being maintained and running in a geographically remote location as a fail-safe backup.

Persons of skill in the cloud computing and networking fields will appreciate that the inventive concepts described in the present disclosure have application well beyond the field of web and business analytics. For instance, any Massively Parallel Processing (MPP) Database System can benefit from the ability to scale in accordance with the embodiments described herein. Since there is no performance penalty associated with adding nodes to the cluster, data storage scaling can be performed at runtime. Moreover, the disclosed scaling system, methods and computer program products optimize for both read and write performance, without sacrificing one for the other.

It should be further understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for scaling of cloud-based data stores during run-time comprising:

providing a graphical user interface (GUI) that allows a user to select an existing database having a plurality of cloud storage volumes for use with one or more cloud-computing instances, the cloud storage volumes containing historical data of one or more customers, the historical data collected from a plurality of first servers configured to receive beacons from a plurality of client devices associated with real users, each first server including a processor coupled with a memory for receiving the beacons, the client devices being distributed among a plurality of geographic locations, each beacon comprising one or more data items which includes a performance metric representative of an experience of a real user on a website or application of a customer, each beacon being generated in real-time from a real user session on the website or application, the GUI allowing the user to input operational commands;

replicating, during run-time as beacons are being received, in response to a first operational command input via the GUI, the existing database to create one or more new databases for use by the one or more cloud-computing instances, each of the new databases having new cloud storage volumes that are an exact replica of the cloud storage volumes of the existing database, each of the new cloud storage volumes being created by taking a snapshot of a corresponding one of the volumes of the existing database such that each new database contains the historical data of the existing database, the replicating resulting in a new set of n databases, where n is an integer greater than 1, which includes the existing database and the one or more new databases, the cloud storage volumes of the existing database being momentarily frozen during the replicating;

executing a mapping algorithm in a cloud-computing instance that maps the historical data of each of the one or more customers according to a round-robin partitioning of the historical data striped by date across the new set of n databases, the cloud-computing instance including a processor coupled with a memory; and compacting, in response to a second operational command input via the GUI, the new set of n databases by dropping data tables in the cloud storage volumes of each of the new set of n databases.

2. The computer-implemented method of claim 1 wherein the compacting comprises dropping (n−1)/n of all the data tables in the cloud storage volumes of each of the new set of n databases.

3. The computer-implemented method of claim 1 wherein the new set of n databases are configured in a circular order for the mapping algorithm, and the round-robin partitioning of the historical data comprises locating data of a customer obtained on a first date in a first one of the new set of n databases, locating data of the customer obtained on a next date in a next one of the new set of n databases, and so on, continuing in the circular order.

4. The computer-implemented method of claim 1 wherein the new set of n databases are configured in a circular order for the mapping algorithm, and the mapping algorithm further comprises a future mapping for a following day wherein data of a customer obtained for the following day is a mapped to a next database in the circular order, the next database being a present database in the circular order incremented by one.

5. The computer-implemented method of claim 1 wherein the mapping algorithm further comprises:
   determining, for each database, whether a total size of the historical data written to the database a certain number of days ago exceeds a specific threshold amount above or below a statistical criteria;
   re-balancing, in response to the specific threshold being exceeded, the mapping of the historical data across the new set of n databases for write workload by customer.

6. The computer-implemented method of claim 5 wherein the re-balancing comprises an iterative process that distributes a portion of the write workload for the database found to exceed the specific threshold, among one or more of a remainder of the of new set of n databases.

7. A non-transitory computer-readable storage medium encoded with computer instructions, which, when executed by one or more processors, operable to:
   provide a graphical user interface (GUI) that allows a user to select an existing database having a plurality of cloud storage volumes for use with one or more cloud-computing instances, the cloud storage volumes containing historical data of one or more customers, the historical data collected from a plurality of first servers configured to receive beacons from a plurality of client devices associated with real users, each first server including a processor coupled with a memory for receiving the beacons, the client devices being distributed among a plurality of geographic locations, each beacon comprising one or more data items which includes a performance metric representative of an experience of a real user on a website or application of a customer, each beacon being generated in real-time from a real user session on the website or application, the GUI allowing the user to input operational commands;
   replicate, during run-time as beacons are being received, in response to a first operational command input via the GUI, the existing database to create one or more new databases for use by the one or more cloud-computing instances, each of the new databases having new cloud storage volumes that are an exact replica of the cloud storage volumes of the existing database, each of the new cloud storage volumes being created by taking a snapshot of a corresponding one of the volumes of the existing database such that each new database contains the historical data of the existing database, replication resulting in a new set of n databases, where n is an integer greater than 1, which includes the existing database and the one or more new databases, the cloud storage volumes of the existing database being momentarily frozen during replication;
   map the historical data of each of the one or more customers according to a round-robin partitioning of the historical data striped by date across the new set of n databases, the cloud-computing instance including a processor coupled with a memory; and
   compact, in response to a second operational command input via the GUI, the new set of n databases by dropping data tables in the cloud storage volumes of each of the new set of n databases.

8. The non-transitory computer-readable storage medium of claim 7 wherein execution of the computer instructions is further operable to drop $(n-1)/n$ of all the data tables in the cloud storage volumes of each of the new set of n databases.

9. The non-transitory computer-readable storage medium of claim 7 wherein the new set of n databases are configured in a circular order and the round-robin partitioning of the historical data comprises locating data of a customer obtained on a first date in a first one of the new set of n databases, locating data of the customer obtained on a next date in a next one of the new set of n databases, and so on, continuing in the circular order.

10. The non-transitory computer-readable storage medium of claim 7 wherein the new set of n databases are configured in a circular order, and execution of the computer instructions is further operable to execute a future mapping for a following day wherein data of a customer obtained for the following day is a mapped to a next database in the circular order, the next database being a present database in the circular order incremented by one.

11. The non-transitory computer-readable storage medium of claim 7 wherein execution of the computer instructions is further operable to:
   determine, for each database, whether a total size of the historical data written to the database a certain number of days ago exceeds a specific threshold amount above or below a statistical criteria;
   re-balance, in response to the specific threshold being exceeded, the mapping of the historical data across the new set of n databases for write workload by customer.

12. The non-transitory computer-readable storage medium of claim 11 wherein the re-balance comprises an iterative process that distributes a portion of the write workload for the database found to exceed the specific threshold, among one or more of a remainder of the of new set of n databases.

13. A system comprising:
   a plurality of first servers configured to receive beacons from a plurality of client devices associated with real users, each first server including a processor coupled with a memory for receiving the beacons, the client devices being distributed among a plurality of geographic locations, each beacon comprising one or more data items which includes a performance metric representative of an experience of a real user on a website or application of a customer, each beacon being generated in real-time from a real user session on the website or application;
   one or more cloud-computing instances;
   a first database having a plurality of cloud storage volumes for use with the one or more cloud-computing instances, the cloud storage volumes containing historical data of one or more customers, the historical data collected from the plurality of first servers;
   a main computing instance that includes a processor coupled with a memory configured to run a computer program that provides a graphical user interface (GUI) that allows a user to input operational commands, the computer program being operable, in response to a first operational command, to replicate during run-time, as beacons are being received, the first database to create one or more new databases for use by the one or more cloud-computing instances, each of the new databases having new cloud storage volumes that are an exact replica of the cloud storage volumes of the existing database, each of the new cloud storage volumes being created by taking a snapshot of a corresponding one of the volumes of the first database such that each new database contains the historical data of the first database, replication resulting in a new set of n databases, where n is an integer greater than 1, which includes the existing database and the one or more new databases, the cloud storage volumes of the existing database being momentarily frozen during replication;

wherein the computer program is further operable, when executed, to map the historical data of each of the one or more customers according to a round-robin partitioning of the historical data striped by date across the new set of n databases; and wherein the computer program is further operable, in response to a second operational command, to compact the new set of n databases by dropping data tables in the cloud storage volumes of each of the new set of n databases.

14. The system of claim 13 wherein the computer program is further operable, in response to a second operational command, to drop $(n-1)/n$ of all the data tables in the cloud storage volumes of each of the new set of n databases.

15. The system of claim 13 wherein the new set of n databases are configured in a circular order and the round-robin partitioning of the historical data comprises locating data of a customer obtained on a first date in a first one of the new set of n databases, locating data of the customer obtained on a next date in a next one of the new set of n databases, and so on, continuing in the circular order.

* * * * *